UNITED STATES PATENT OFFICE.

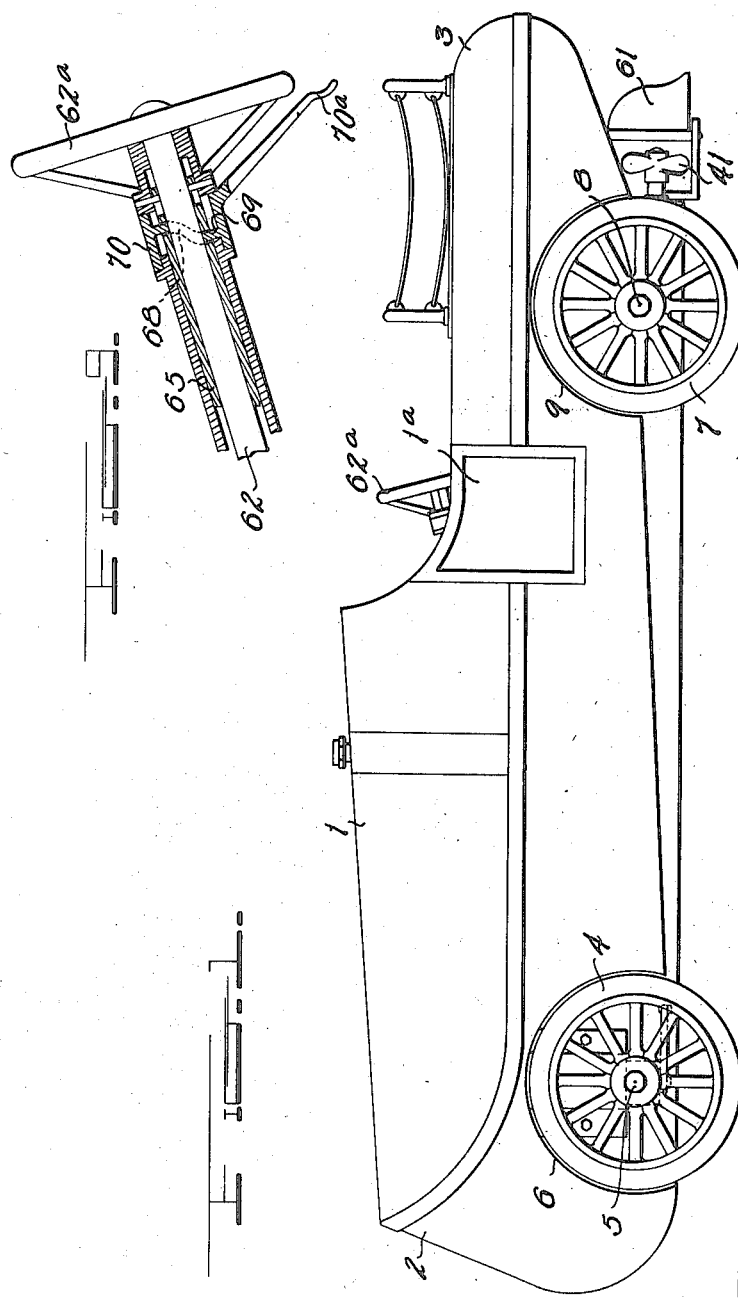

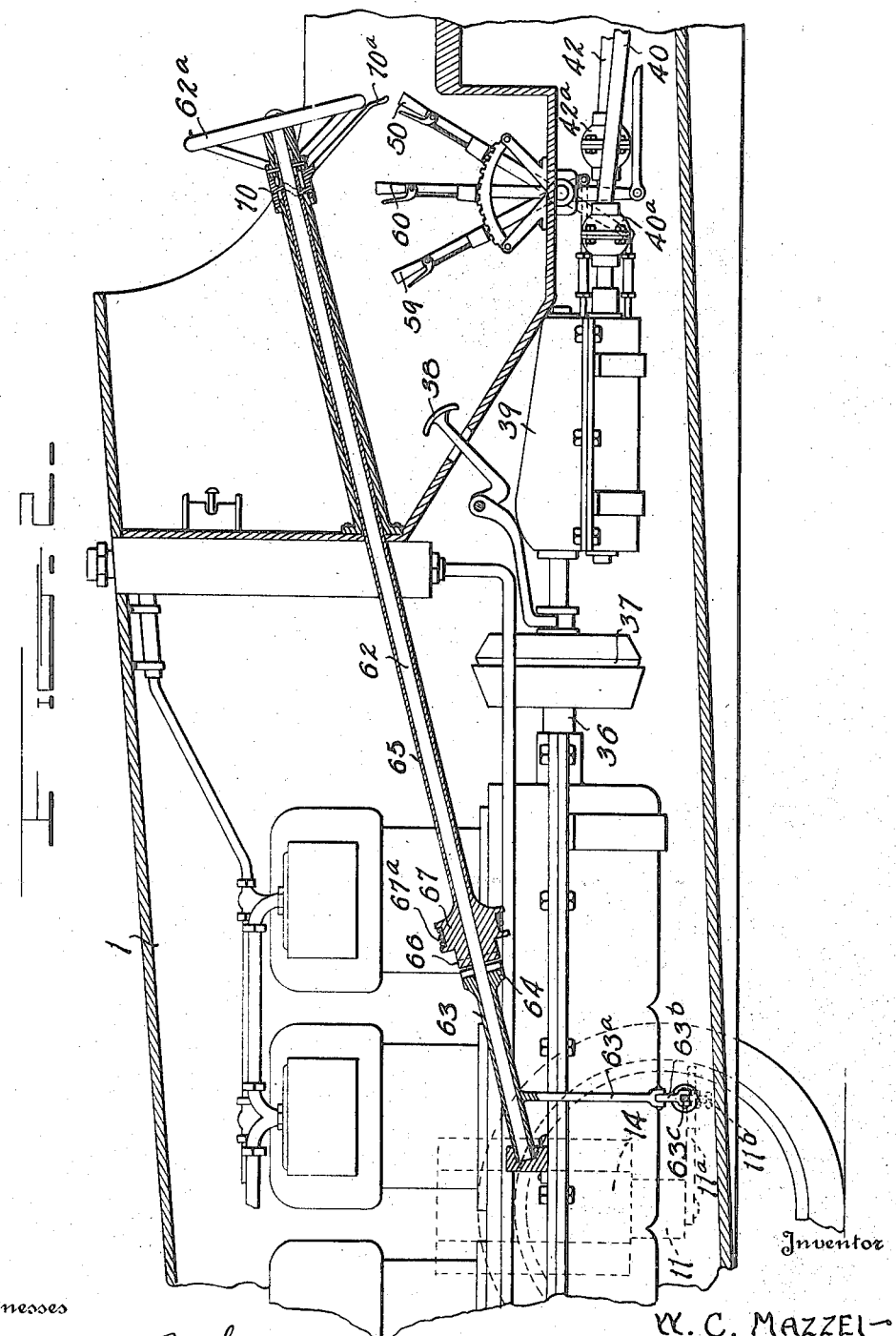

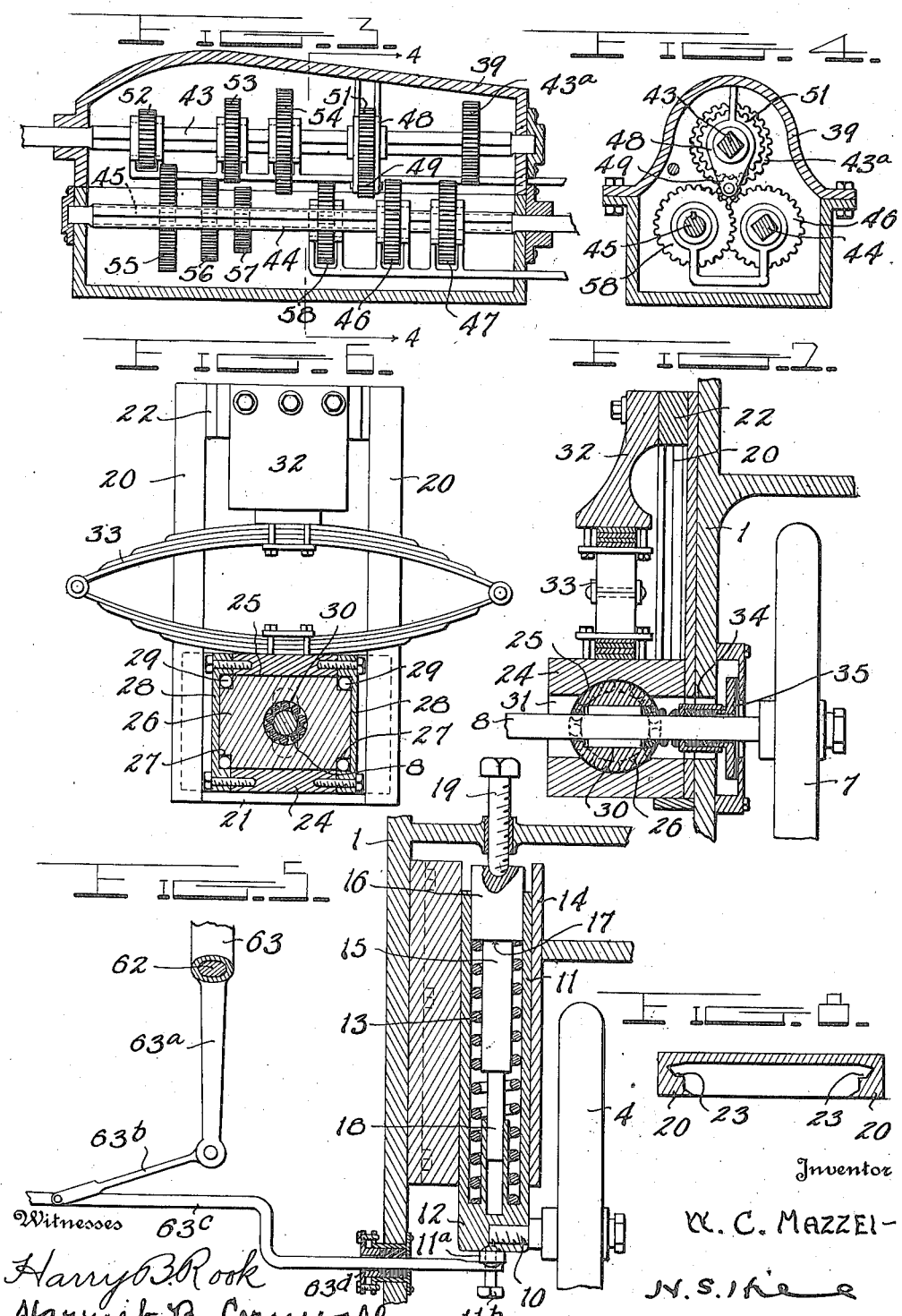

WILLIAM C. MAZZEI, OF LOS ANGELES, CALIFORNIA.

AUTOMOBILE BOAT.

1,135,126.  Specification of Letters Patent. Patented Apr. 13, 1915.

Application filed February 28, 1914. Serial No. 821,778.

*To all whom it may concern:*

Be it known that I, WILLIAM C. MAZZEI, a subject of the King of Italy, and residing at 1578 West Forty-eighth street, city of Los Angeles, county of Los Angeles, State of California, have invented certain new and useful Improvements in Automobile Boats, of which the following is a specification.

The present invention relates to certain new and useful improvements in self propelled vehicles and more particularly to that class of self propelled vehicles which are adapted to travel upon land and water, one object of the invention being to provide a device of this character which may be driven from land to water or vice versa without any preliminary preparations such as retracting the land traction wheels into the body of the vehicle or applying paddles or other means suitable to marine propulsion to the wheels or other parts of the machine.

A further object is to provide a device of the character described which may be propelled upon land or water from the same source of power, by merely throwing a lever to engage the engine drive shaft with either desirable means of propulsion.

A still further object of the invention is to provide a device of the character described which may be steered from the same wheel when traveling on land or water.

Another object of the invention is to provide a device wherein, owing to its duplex construction, the spring action of the body upon the running gear characteristic of automobiles or other land vehicles is not impaired but rather enhanced.

Another object is to provide a device of this character wherein the traction wheels utilized in traveling upon the land are mounted in such a manner as to decrease the impedance to progress of the device when traveling on water, caused by the contact of the wheels and axles with the water, to the minimum.

Another object of the invention is to provide a self propelled vehicle of the class described which shall be comparatively simple in operation and inexpensive in its construction.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawings, in which:—

Figure 1 is a side elevation of a device constructed in accordance with the present invention. Fig. 2 is an enlarged longitudinal sectional view through the body of the vehicle, the engine and complemental running gear being shown in side elevation, and parts being broken away. Fig. 3 is an enlarged longitudinal sectional view through the gear changing box. Fig. 4 is a transverse sectional view through the same taken on the line 4—4 of Fig. 3. Fig. 5 is a detail view of one of the front suspension springs and steering mechanism, parts being broken away and shown in section. Fig. 6 is a side elevation of one of the rear suspension springs, parts being broken away and shown in section. Fig. 7 is a transverse sectional view through the same. Fig. 8 is a section through the guide members. Fig. 9 is an enlarged detail sectional view of the mechanism for engaging and disengaging the sleeves mounted on the steering rod.

Corresponding and like parts are referred to in the following description and indicated in all the views of the drawings by the same reference characters.

Specifically describing the invention, the numeral 1 designates the body of the vehicle constructed in substantially the form of the hull of a boat, the numeral 2 representing the bow and 3 the stern thereof. A door 1ª is provided at the sides of the body for entering and leaving the vehicle when traveling on land, the said door being provided with watertight joints. At the front end of the vehicle are the usual wheels 4 mounted upon the axles 5. It is to be noted that these wheels are mounted in recesses 6 at the side of the body so as not to project beyond the sides of the body and thus impede the progress of the device when traveling on water. At the rear of the vehicle are the usual wheels 7 mounted on the axle 8. These wheels are also mounted in recesses 9 in the sides of the body for the same reasons above stated.

It will be noted with reference to Fig. 5 that the wheels 4 are mounted in a manner peculiar to this invention. The axles 5 do not extend into the body, but a short stud 10 formed on the inner end of the axle is screwed into the bottom of a tubular member 11 closed at one end 12 which is influenced by a coil spring 13 mounted therein and which has a vertically sliding movement in a tubular sleeve 14 which is in turn fastened by any suitable means to the body 1 of the vehicle on the inner face of the recess 6. Mounted within the tubular sleeve 14 and forming one bearing point of the spring 13 is a core 15. The top 16 of the core 15 is enlarged, which enlargement provides an annular shoulder 17 against which one end of the spring 13 rests, the other end of the spring resting on the bottom of member 11. The enlarged end 16 further serves as a guide for the tubular member 11, as also does the bottom end 18 thereof. The enlarged top end is engaged by a screw 19 which is suitably mounted in the body 1 of the vehicle at the top of the recess. The wheel 4 is mounted in any suitable manner upon the axle 5 carrying the short stud 10 screwed or otherwise fastened to the bottom of the tubular sliding member 11. It will be obvious that as the wheel 4 passes over an obstruction in the road the tubular member 11 will be forced upwardly against the action of the spring 13 the said spring thus absorbing the shock which would otherwise result.

A screw 19 is mounted in the body of the device and engages the top of the core 15 to adjustably support the body 1 upon the spring 13 and the axle 5. This screw is adjustable, and the body may be raised or lowered as desired by turning the screw 19. As the axle 5 is fixed owing to its connection with the wheel 4 which rests on the ground, it will be obvious that turning the screw 19 so as to force the core 15 downwardly against the spring 13 will raise the body 1 upwardly and vice versa.

The mounting of the body 1 upon the rear wheels is somewhat different than the mounting of the body on the front wheels due to the fact that the rear axle 8 extends entirely through the body, the rear axle being connected to the drive shaft in the manner common to automobiles. Rigidly fastened to the inside faces of the sides of the body 1 are a pair of guides 20 for each rear wheel, connected at their bottoms by a cross piece 21 and at their tops by a cross piece 22. Each guide is correspondingly recessed as at 23 to receive a slide member 24, slidably mounted between each pair of guides, the recesses 23 serving to prevent the slide member from falling out of engagement with the guides 22. The slide member 24 is provided with a central bore 25 which is adapted to receive a cylindrical member 26 provided at each end with a ball race 27. At each end of the slide member 24 are provided end plates 28 which serve to keep the balls 29 in the race 27 and also to prevent the cylindrical member 26 from getting out of engagement with slide member 24. The cylindrical member 26 is provided with a transverse bore 30 through which passes the axle 8. The slide member 24 is further provided on opposite sides thereof with slots 31 registering with the transverse bore 30 of the cylindrical member 26.

At the top of the guide members 20 and fastened to the cross piece 22 is a bearing block 32 between which and the slide member 24 is mounted an elliptic leaf spring 33, mounted within the body of the vehicle. The side of the body 1 is provided with a slot 34 registering with the slot 31 of the slide member 24. A packing box 35 surrounds the axle 8 within the slots 31 of the slide member and the slots 34 in the side of the body 1, so as to prevent water from entering the body of the vehicle when the same is traveling upon water.

It will be obvious, that when the wheel 7 strikes an obstruction, the axle 8 may assume any angle to overcome the obstruction or imperfection in the road, as owing to the slots 31 and 34 and the cylindrical member 26 provided with ball bearings 29, the said cylindrical member may readily revolve in the slide casing 24 to accommodate the movement of the axle in a vertical direction.

Over the front wheels, as is common to automobiles of to-day, is mounted a conventional gasolene engine, provided with the usual drive shaft 36. Mounted upon the said drive shaft 36 is a clutch 37 which is operated by means of the foot lever 38 so as to engage or disengage the drive shaft of the engine with the gearing in the gear casing 39. The vehicle is provided with a shaft 40 which drives the propeller 41 and also with a shaft 42 which drives the rear wheels 7. The power is transferred to either shaft 40 or 42 as desired by the shifting of gears in the gear casing 39.

Mounted within the casing 39 is a longitudinal square shaft 43 which is connected to the drive shaft 36 of the engine by manipulation of the clutch 37. Below and to the left of this shaft 43 is mounted another longitudinal shaft 45 which is connected to shaft 42 by the universal joint 42$^a$. Below and to the right of shaft 43 is mounted still another longitudinal square shaft 44 which is connected to shaft 40 by means of universal joint 40$^a$ which drives the propeller when the device is traveling on water. Mounted upon the shaft 43 is a gear 43$^a$ which is the means for transferring the power from shaft 43 to shaft 44 to drive the propeller. On the propeller shaft are mounted slidable gears 46 and 47. Depending in a suitable bracket 48 from shaft 43 is an idler pinion 49. This idler pinion 49 serves in connection with the reversing of either the propeller shaft or the drive shaft for the rear wheels.

To drive the propeller shaft in a direction necessary to propel the device forwardly when traveling in water, the gear 47, slidable on shaft 44, is forced into engagement with the gear 43ª, rigid on shaft 43, by manipulating the lever 50 in a counter clockwise direction (as seen in Fig. 2), while in order to reverse the propeller shaft, the gear 46 slidable on shaft 44, is forced into engagement with the idler 49, which is always in engagement with the gear 51 on shaft 43, by manipulating the lever 50 in the opposite direction.

Gears 52, 53, 54, slidable on shaft, 43 in connection with gears 55, 56, 57, rigid with shaft 45, serve to drive the rear wheels in one direction while gear 51, idler 49 and gear 58 serve to drive the rear wheels in the opposite direction. If a comparatively slow speed is desired on the drive shaft for the rear wheels the clutch 37 is manipulated to connect shafts 43 and 36. The gear 52 is then brought into engagement by means of lever 59 with gear 55. This gives the slowest speed. If the next highest speed is desired, gear 52 is disengaged from 55 and the gear 53 brought into engagement with 56. Should the highest speed be desired, the gear 53 is disengaged from gear 56 and the gear 54 is brought into engagement with gear 57.

In order to reverse the drive wheels the gear 58 is brought into engagement with the idler 49, which is always in engagement with gear 51 on shaft 43. It will be readily seen therefore that the power may be quickly and easily transferred from the rear wheels 7 to the screw propeller 41 as the circumstances require and that either mode of propulsion may be reversed at the will of the operator. The lever 60 serves to operate an emergency brake not shown.

Whether traveling on land or water the device is steered from the same wheel 62ª, the ropes for operating the rudder 61 and the gear for operating the front wheels being controlled from the same wheel. Mounted on the steering rod 62 is a sleeve 63 which has an enlarged toothed end 64. This sleeve communicates with the gearing utilized in operating the front wheels. This sleeve 63 has rigidly connected thereto and depending therefrom an arm 63ª which has its lower end pivotally connected to one end of a link 63ᵇ, the opposite end of which is pivotally connected to a cross rod 63ᶜ. The opposite ends of this cross rod penetrate the body 1 of the vehicle and have a pin and slot connection with the outer ends of lever arms 11ª whose opposite ends are rigidly connected to the bottom of the tubular members 11, the said lever arms 11ª extending rearwardly therefrom. Long bolts 11ᵇ serve to connect the ends of cross rods 63ᶜ with the respective lever arms 11ª so that the tubular members 11 may slide freely up and down in their casings 14 and not be bound by the ends of the cross rod 63ᶜ. A stuffing box 63ᵈ surrounds the cross rod 63ᶜ where the same passes through the body 1 so as to prevent water from entering the vehicle. It will be obvious that with this construction when the sleeve 63 is rotated in either direction the cross rod 63ᶜ will be moved transversely of the body of the vehicle and the lever arms 11ª correspondingly moved so that the tubular members 11 are rotated in the casings 14, thus turning the front wheels 4. On the same rod is mounted another sleeve 65 having an enlarged toothed end 66, the notches of sleeve 63 and sleeve 65 coöperating to transmit motion from the steering wheel 62ª to the front axle when they are brought into engagement with each other. The sleeve 63 is also provided with a drum 67 around which are adapted to be wound the rudder controlling ropes 67ª, the arrangement and connection of said ropes being the same as is customary in fitting out boats.

The sleeve 65 extends upwardly to and is connected to the steering wheel 62ª. Near its end is provided a cam slot 68 in which slot pins 69, carried by a collar 70 provided at one side thereof with a projection 70ª, operate to engage and disengage the notched end of sleeve 65 from the notched end of sleeve 63. When the collar 70 is rotated by means of the projection or lever 70ª in one direction the pins 69 mounted in said collar 70 engage the edges of the cam slot 68 to force the sleeve 65 into engagement with sleeve 63. When the parts are in this position the front wheels may be operated by turning the steering wheel 62ª. When, however, the vehicle is traveling in water the collar 70 is rotated in the opposite direction, thus disengaging sleeves 63 and 65, whereby the drum 67 on sleeve 65 may be rotated and the rudder rope wound upon it according to the direction of rotation of the steering wheel. When the parts are in this position the steering wheel 62ª may be rotated without moving the front wheels. It will, therefore, be obvious that the vehicle may be readily steered by the same wheel whether traveling on land or water by merely moving a small lever in the right direction. Furthermore, the vehicle always carries with it all the essentials incident to traveling upon land or water, and not only this, but all parts are always in position there being no necessity for removing parts when traveling from water to land or adding parts when traveling from land to water.

The device as a whole has a neat appearance having no unsightly projections or the like, the body of the vehicle being as adaptable to land traveling as to traveling upon water.

Having thus described my invention, what I claim as new and desire to secure by Letters Patent, is:—

1. A device of the character described including a buoyant body, means for carrying said body on land, means for propelling the device on both land and water, means for steering the device on land and water from the same steering wheel including a rudder, a rod, a steering wheel rotatably mounted on said rod, a pair of sleeves rotatably mounted on said rod, one of which is also slidable on said rod, one of said sleeves being connected to the land traveling means, while the other is connected to the rudder and the steering wheel, and means for engaging and disengaging said sleeves.

2. A device of the character described including a buoyant body, wheels for carrying said body on land, means for propelling the device on both land and water, means for steering the device on both land and water from the same steering wheel including a rudder, rudder controlling ropes, a rod mounted on the body, a steering wheel rotatably mounted on said rod, a pair of sleeves rotatably mounted on said rod, one of which is also slidable on said rod, said sleeves having coöperating enlarged toothed ends, one of said sleeves being connected to the wheels carrying the body on land, while the other sleeve is connected to the rudder controlling ropes and the steering wheel, and means for engaging and disengaging said sleeves.

3. A device of the character described including a buoyant body, means for propelling the device on both land and water, wheels for carrying said body on land, means for steering the device on both land and water from the same steering wheel including a rudder, rudder controlling ropes, a rod mounted on the body, a steering wheel rotatably mounted on said rod, a pair of sleeves rotatably mounted on the said rod, one of which is also slidable upon said rod, said sleeves having coöperating enlarged toothed ends, one of said sleeves being connected to the wheels carrying the body on land, while one end of said other sleeve is connected to the steering wheel, the other end being provided with a drum around which are adapted to be wound the rudder controlling ropes, and cam means for engaging and disengaging the said sleeves.

4. A device of the character described including a buoyant body provided with recesses in the sides thereof, axles situated in said recesses, springs connected to said axles, means for adjustably mounting the body upon said springs, wheels mounted on the axles and situated in the recesses in the sides of the body, and means for propelling the device on both land and water.

5. A device of the character described including a buoyant body provided with recesses in the sides thereof, tubular members slidably mounted in said recesses, springs mounted in said tubular members, axles connected to said tubular members and situated in said recesses, means for adjustably mounting the body on said springs, wheels mounted on the axles and situated in the recesses in the sides of the body, and means for propelling the device on land and water.

6. A self-propelled vehicle adapted to travel on land and water, including a buoyant body provided with recesses in the sides thereof, axles penetrating said body and having a spring connection therewith, said spring connection being within the body, wheels mounted upon said axles adapted to carry the body on land and situated in recesses in the sides of the said body, and means for propelling the device on land and water.

7. A device of the character described, including a buoyant body, axles penetrating the body and having a spring connection therewith, said spring connection being within the body, wheels adapted to carry the body on land being mounted on said axles, means whereby the axle is allowed to be angularly displaced to conform to any obstruction or imperfection in the road, means for preventing water from entering the body around said axle, and means for propelling the vehicle on land and water.

WILLIAM C. MAZZEI.

Witnesses:
ERNEST M. TORCHIA,
SAMUEL ROSENTHAL.